United States Patent
Shoykhet

[19]

[11] Patent Number: 6,129,477
[45] Date of Patent: Oct. 10, 2000

[54] COMPOSITE TORQUE TUBE FOR SUPERCONDUCTING MOTOR

[75] Inventor: Boris A. Shoykhet, Beachwood, Ohio

[73] Assignee: Reliance Electric Technologies, LLC, Thousand Oaks, Calif.

[21] Appl. No.: 08/895,653

[22] Filed: Jul. 17, 1997

[51] Int. Cl.[7] .................................................. B25G 3/34
[52] U.S. Cl. ......................... 403/267; 310/52; 310/261; 464/88; 464/903; 403/265
[58] Field of Search ...................... 403/267, 265, 403/266, 179, 404; 310/52, 61, 261, 262, 10; 464/902, 903, 88

[56] References Cited

U.S. PATENT DOCUMENTS

| | | | |
|---|---|---|---|
| 4,275,122 | 6/1981 | Fisher | 52/726.1 |
| 4,632,590 | 12/1986 | Tsuchimoto | 403/179 X |
| 4,722,717 | 2/1988 | Salzman et al. | 403/265 X |
| 5,122,704 | 6/1992 | Blakeley et al. | 310/54 |
| 5,665,187 | 9/1997 | Mackellar | 29/525.13 |
| 5,880,547 | 3/1999 | Shoykhet | 310/61 X |

*Primary Examiner*—Terry Lee Melius
*Assistant Examiner*—David E. Bochna
*Attorney, Agent, or Firm*—John J. Horn; William R. Walbrun; Michael A. Jaskolski

[57] ABSTRACT

A rotor support for use in superconducting motors including first and second torque tubes secured between first and second rotor shaft ends and a rotor winding supporter wherein each tube consists of a thermally insulating composite conduit having first and second ends and first and second couplers adhesively bonded to the first and second ends along tapered securing surfaces resulting in essentially singularity-free joints between the conduit and couplers despite disparate shear modulus.

30 Claims, 4 Drawing Sheets

COMPOSITE TORQUE TUBE FOR SUPERCONDUCTING MOTOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to superconducting motors and more particularly to a superconducting rotor assembly including adhesively secured composite torque tubes.

Generally, referring to FIG. 1, an AC synchronous superconducting motor 200 includes a rotor support 202 mounted on a rotor shaft 204a and 204b. Rotor windings 206 are arranged around the support forming a rotor assembly. The assembly is mounted inside a stator cavity 208. The stator includes a plurality of stator windings 210 arranged to form cavity 208. A DC current is provided to rotor windings 206 which generates a rotor field inside cavity 208. An AC current is provided to stator windings 210 which generates a magnetic field therearound located at least partially within cavity 208. By time varying the AC current, the stator field is caused to rotate about cavity 208. The rotor and stator fields interact and, as the stator field rotates about cavity 208, the rotor follows.

Three important motor criteria for any type of motor are size, power output and efficiency. High power and small size are desirable without compromising efficiency. These three criteria do not always go hand in hand. For example, the simplest way to increase motor output is to increase stator and rotor currents. Increased currents result in stronger stator and rotor fields and therefore stronger attraction between the fields.

Unfortunately, as currents are increased, so to is the heat generated by the currents as the currents pass through the stator and rotor windings. The energy spent to generate heat constitutes a large portion of input energy losses. Higher heat means less efficient motor operation. At some point, stator and rotor current levels reach a value where generated heat reduces motor efficiency below a specified level. In these cases, generally, to increase output further, motor size must be increased.

Recent advances in superconductivity have facilitated the design of synchronous motors which generate relatively high power output for their size when compared to conventional motors. To this end, some motors have been developed which include superconducting rotor coils capable of carrying massive amounts of current through relatively few windings. Thus, were superconduction can be achieved fewer windings can accommodate increased currents and rotor girth and length can be minimized thereby reducing overall motor size.

In order to facilitate superconduction, conductors have to be extremely cold (i.e. approximately 5° K. for low temperature superconductors). To this end, referring again to FIG. 1, the superconducting rotor winding support 202 is located inside a vacuum jacket 209. The vacuum is absolutely necessary to provide adequate thermal insulation from heat in the ambient around the rotor. At least one shaft end 204b is typically hollow, end 204b forming a passageway 214 therethrough. Hollow end 204b is connected to a refrigeration system 216 which provides a cooling agent (e.g. liquid or gaseous helium) to the support 202 via a supply tube 207 which cools the support 202 and thereby maintains cold rotor windings 206. In addition, first and second torque tubes are typically provided which spatially isolate first and second shaft ends 204a and 204b, respectively, from support 202.

Torque tube design and features are generally governed by tube functions. Tubes 212a and 212b are usually formed of stainless steel. Stainless steel is a non-magnetic metal with relatively low thermal conductivity (for metals), which is important for thermal insulation, and is strong enough to withstand high rotor torque. The tube length is typically relatively long since longer tubes attenuate heat transfer to the rotor support.

In addition to general shape, length and material, tube functions can also be used to identify optimal tube wall thickness. As indicated above, tubes 212a and 212b must both isolate support 202 from ends 204a and 204b and must impart shaft torque to support 202. To improve isolation, tube wall thickness is typically kept to a minimum thereby providing a mechanical "heat bottleneck" between ends 204a, 204b and support 202. However, to ensure structural integrity during torque transfer, there is a minimum wall thickness requirement. The minimum thickness is typically a safe thickness plus some additional girth to account for tube imperfections.

Unfortunately, typical tube construction and superconducting rotor configuration often lessen the advantages associated with superconducting motors. Because tubes 212a and 212b are provided between ends 204a and 204b and support 202, the tubes directly increase overall motor size. For example, where each tube 212a and 212b is eight inches long, overall motor length $L_1$ (see FIG. 1) must be increased by sixteen inches to accommodate the tubes. Thus, tubes 212a and 212b minimize the superconducting size advantage.

In addition, while tubes 212a and 212b are mechanically constructed to minimize heat transfer from ends 204a and 204b to support 202 and stainless steel has relatively low thermal conductivity when compared to other metals, stainless steel conducts significant heat. Thus, tubes 212a and 212b conduct heat from ends 204a and 204b to support 202 and windings 206. To compensate for heating losses and maintain low temperatures in the support structure, the size and power of the refrigeration system must be increased. This power increase in turn results in a less efficient motor as increased power for refrigeration must be factored into the efficiency calculation as a loss.

One solution to reduce tube heating is to form tubes 212a and 212b out of a thermally insulating material such as a composite including bonded glass fibers and an epoxy resin (hereinafter referred to as a "glass-epoxy composite" or simply a "composite"). To this end, each tube 212a and 212b may include a composite cylinder having first and second ends to be connected to shaft ends 204a, 204b and support 202, respectively. Unfortunately, it has proven particularly difficult to satisfactorily secure such a composite cylinder to the shaft ends and support.

It has been found that to withstand high motor torque, composite fibers should be arranged about a rotation axis at an angle (e.g. 45°) with respect to the axis such that the fibers extend at least partially axially along the tube. One way to secure a tube to a rotor winding support or a shaft end is to use a plurality of bolts, rivets or the like.

The bolts, rivets, etc., can be tightened onto the composite in the radial direction (i.e. through the composite cylinder wall essentially perpendicular to the rotation axis and fiber lengths). To this end, each of the shaft ends may include a coupler port and the support may include two oppositely facing coupler ports for receiving and securing adjacent cylinder ends. Each port would axially overlap and bolt to an adjacent cylinder end along a connection distance radially of the cylinder wall.

While heat transfer could be minimized in this manner, motor size would likely be increased to accommodate required tube connection distances. This is because the connection distance required to provide a sufficiently strong joint between the tube and plate ends is relatively long. For example, experiments have shown that to provide a sufficiently strong cylinder-port joint, each connection distance may be on the order of 4 inches. For this reason, because there are four joints (i.e. one at each end of each of the two tubes), the joints will often increase motor length by as much as 16 or more inches.

Another way to secure a composite cylinder to a support or shaft end would be to use an adhesive bond therebetween. Unfortunately, the bond provided by this solution is typically not strong enough to withstand motor torque and shaft stresses over extended operating periods.

A shear modulus is a constant associated with a material which indicates the amount of stress which occurs within the material when a shear deformation is applied across a surface thereof. Metal typically has a shear modulus which is much greater than a glass-epoxy composite shear modulus. When tubular members formed of materials having disparate shear moduli are adhesively bonded along a joint, torsional stress concentration points typically result along the length of the joint. These stress concentration points are referred to herein as singularity points. Usually singularity points will initially occur at the boundaries of the joint (i.e. at either end).

Because virtually all torque is transferred through the vicinity of singularity points and little is transferred through the rest of the joint, the bond at the joints will often fail. Once a bond fails, other singularity points along the joint length occur and the bonds thereat eventually fail until, after a period, the entire joint fails. This is unacceptable in the motor environment and therefore adhesive joints have not as of yet been used in the electrical superconducting machinery torque tube art.

Therefore, it would be advantageous to have a torque tube construction which thermally isolates a winding support from shaft ends yet is simple and inexpensive to manufacture and which does not increase overall motor size.

BRIEF SUMMARY OF THE INVENTION

The present invention includes a torque tube comprising a thermally insulative tubular member having first and second ends and first and second metal couplers at the first and second ends, respectively, for connection to a shaft and a rotor supporter, respectively. The member and couplers are secured along securing joints via an adhesive layer.

The securing surfaces are specially configured to essentially eliminate singularity points along the securing joints thereby facilitating an extremely strong bond with a relatively short joint length. To this end, the composite securing surface is tapered so that it slopes radially at a specific first angle and the coupler securing surface is tapered so that it conforms to the composite securing surface. A coupler incline surface opposite the coupler securing surface is also tapered at a specific second or incline angle and a surface adjacent the coupler securing surface is parallel to the incline surface.

The first and second angles are a function of the composite and coupler materials. Specifically, the first and second angles are a function of a design adhesion stress, a design composite stress, a metal shear modulus and a composite shear modulus.

One object of the invention is to reduce torque tube heat transfer into a superconducting rotor. To this end, the present torque tubes impede heat transfer as they are formed at least in part of a thermal insulating material such as glass-epoxy composite.

Another object is to provide a thermally insulating torque tube which does not increase overall motor size. The present tube only requires a short joint length to form a strong, essentially singularity-free bond between two tubular members despite disparate shear modulus.

Yet another object is to reduce torque tube manufacturing costs. When the first and second angles are chosen properly, a simple adhesive bond can be formed instead of a bolt type connection thereby eliminating the need for a plurality of mechanical parts and manual assembly.

The invention also includes a general purpose joint assembly for co-axially connecting cylindrical members which are formed of different materials having different shear modulus, the assembly essentially eliminating stress singularities along the joint. The assembly includes a first tubular member formed of a first material having a first shear modulus. The first member is formed around an axis and has a proximal edge at a proximal end and has internal and external surfaces, the internal and external surfaces each being first surfaces. One of the first surfaces forms a first proximal surface at the proximal end, at least a portion of the first proximal surface sloped radially to the proximal edge so as to define a first angle with respect to the axis.

A second tubular member is formed of a second material having a second shear modulus. The second member has a proximate edge at a proximate end and has inner and outer surfaces, the inner and outer surfaces each being second surfaces. One of the second surfaces forms a proximate surface at the proximate end and the other of the second surfaces forming an incline surface. The proximate surface includes second proximal and second distal surfaces, the second proximal surface separating the second member from the second distal surface. The second distal surface slopes radially to the proximate edge such that the second distal surface conforms to the first proximal surface. At least a portion of the incline surface slopes radially to the proximate edge so as to define a second angle with respect to the axis. The second proximal surface is parallel to the incline surface. The first proximal and second distal surfaces are secured together by an adhesive layer wherein, the first and second angles are a function of the shear modulus. Preferably, the first material is a glass-epoxy composite and the second material is a metal.

In one embodiment the external surface forms the second distal surface, the inner surface forms the first proximal surface and the outer surface forms the incline surface.

Thus, another object of the invention is to provide a general, all purpose joint configuration for adhesively joining two cylindrical member at their ends in a manner which essentially eliminates singularity points along the length of the joint. This is accomplished by choosing bonding angles as a function of various material characteristics as described in detail below.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

A. Theory

Figure 1:
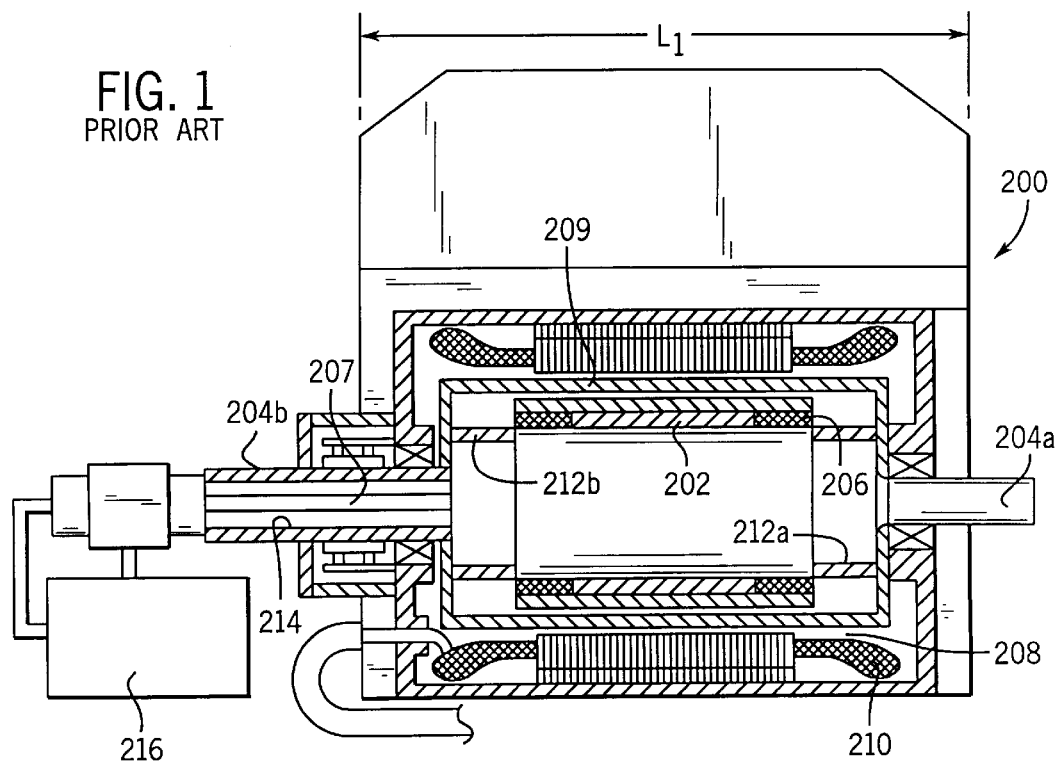
FIG. 1 is a partial cross-sectional view of a prior art superconducting motor system.

In the description that follows, like reference numerals throughout the figures and the specification are used to identify the same components, assemblies, systems, directions, angles, etc. In addition, subscripts "c" and "s" are used to identify parameters related to a composite material and to a metal (e.g. steel) material, respectively.

Figure 2:
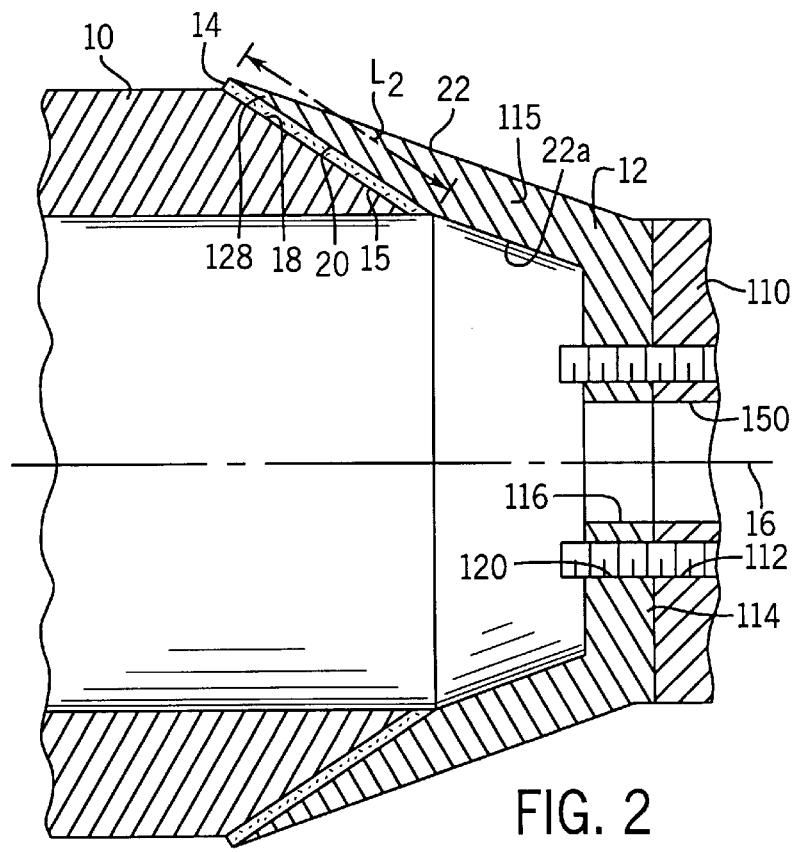
FIG. 2 is a cross-sectional view of a singularity-free joint according to the present invention.

Referring to FIG. 2, the present invention allows two tubular members 10, 12 which are formed of materials characterized by disparate shear moduli, where the modulus associated with the member 12 is much larger than the modulus associated with member 10, via an adhesive layer 15 end to end along securing external and inner surfaces 18, 20 to form a singularity-free securing joint 14 having a length $L_2$. "Singularity-free" means that when rotational torque causes member 12 to rotate about a central axis 16 through member 12, stress is essentially evenly distributed along entire joint length $L_2$.

If a singularity point does occur somewhere along length $L_2$, the bond at the singularity point fails first and a new singularity point occurs at some other location along joint length $L_2$. Eventually, all points along length $L_2$ fail and the bond therealong fails. However, as stress is essentially evenly distributed along entire length $L_2$ with the present invention, there is rarely a singularity point along length $L_2$ so that the joint as a whole absorbs the rotational torque and stress and therefore the likelihood of joint failure is substantially reduced.

To eliminate singularity points along length $L_2$, angles formed by external and inner surfaces 18, 20 and an incline angle formed by an outer incline surface 22 with respect to surface 20 are precisely chosen. In addition, an inner proximal surface 22a is parallel to surface 22.

To develop equations which essentially eliminate singularity points, it is helpful to begin with a simple model from which several general conclusions about a singularity-free joint can be derived. To this end, for large tube diameters a specific portion of a joint can be modeled as a two dimensional asymmetrical problem. In order to find singularity point parameters in a closed form, it is also helpful to first consider isotropic materials. Isotropic means that a material exhibits properties with identical values when the values are measured along axis in all directions.

Figure 3:
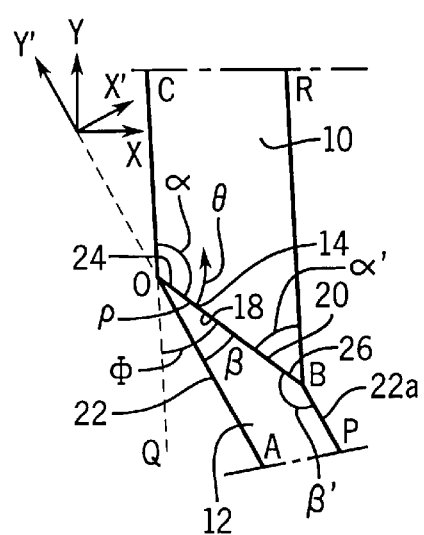
FIG. 3 is a two-dimensional schematic of a section of the joint of FIG. 2 illustrating specific joint tapered angles.

Referring also to FIG. 3, a two-dimensional section of joint 14, without adhesive 15, is illustrated. For the purposes of this explanation, it will be assumed that member 10 is formed of an isotropic composite material $\Omega_c$ (e.g. glass-epoxy composite) while member 12 is formed of an isotropic metal $\Omega_s$ (e.g. steel). Composite $\Omega_c$ is characterized by a shear modulus $G_c$ while metal $\Omega_s$ is characterized by a shear modulus $G_s$ where $G_c$ is substantially less than $G_s$. Both Polar (θ, ρ, z) and first (x,y,z) and second (x',y',z) Cartesian coordinate systems have been superimposed on FIG. 3 with securing joint 14 (i.e., OB) aligned with radial coordinate ρ, the y axis vertical and parallel to the length of member 10 (i.e. CO), the z axis (not illustrated) extending perpendicular to the x and y axes, and the y' axis parallel to external surface 22 (i.e. OA).

The points of interest along securing joint OB are generally adjacent first and second joint ends 24, 26, respectively. It is at these joint ends 24, 26 that singularity points typically first occur. First joint end 24 will be analyzed, then joint end 26 will be separately analyzed and then the results of both analyses will be combined to provide singularity free equations.

At first end 24, external surface 18 forms an angle α (i.e. <COB) with the vertical y-axis. A "composite tapered" angle φ is equal to π−α. Inner surface 20 conforms to surface 18 (i.e. to angle φ) and outer surface 22 forms a "metal tapered" angle β with surface 20. Similarly, at second end 26, member 10 forms an angle α' (=π−α) with the y-axis while member 12 forms an inner angle β'. Equations for singularity point parameters at both ends 24 and 26 can be derived.

With respect to first end 24, the way to determine singularity parameters is as follows. Consider angle AOB and extend lines OA and OB to infinity, so that member 12 becomes a cone with vertex O and angle β. Similarly, consider angle COB and extend line OC and OB to infinity so that member $\Omega_c$ also becomes a cone with vertex O and angle α. After this artificial extension of actual areas $\Omega_s$ and $\Omega_c$, consider the following homogeneous, two-dimensional, asymmetrical problem:

$$u_z = u(\rho, \theta) \qquad \text{Eq. 1}$$

$$\gamma_{\rho z} = \frac{\partial u}{\partial \rho}; \gamma_{\theta z} = \frac{1}{\rho}\frac{\partial u}{\partial \theta} \qquad \text{Eq. 2}$$

$$\sigma_{\rho z} = G\gamma_{\rho z}; \sigma_{\theta z} = G\gamma_{\theta z}; G = \begin{cases} G^c \text{ in } \Omega_c \\ G_s \text{ in } \Omega_s \end{cases} \qquad \text{Eq. 3}$$

where σ represents stress, $$\frac{\partial^2 u}{\partial \rho^2} + \frac{1}{\rho}\frac{\partial u}{\partial \rho} + \frac{1}{\rho^2}\frac{\partial^2 u}{\partial \theta^2} = 0; 0 < \rho < \infty, -\beta \le \theta \le \alpha, \qquad \text{Eq. 4}$$

$$\frac{\partial u}{\partial \theta} = 0, \theta = \alpha, \theta = -\beta$$

$$G^s \frac{1}{\rho}\frac{\partial u^s}{\partial \theta} = G^c \frac{1}{\rho}\frac{\partial u^c}{\partial \theta}; u^s = u^c, \theta = 0 \qquad \text{Eq. 5}$$

Here and below the solutions in members 12 and 10 are distinguished by upper case indexes S and C, respectively. Next, we must derive solutions to Equations 1 through 5 having the form:

$$u = \rho^\lambda U(\theta) \quad \text{Eq. 6}$$

Substituting Equation 6 into Equations 1 through 5 and simplifying, Equations 1 through 5 reduce to a boundary value problem for an ordinary differential equation as:

$$\lambda^2 U + \frac{d^2 U}{d\theta^2} = 0; \frac{dU}{d\theta} = 0, \theta = \alpha, \theta = -\beta \quad \text{Eq. 7}$$

$$G^s \frac{dU^s}{d\theta} = G^c \frac{dU^c}{d\theta}, U^s = U^c, \theta = 0 \quad \text{Eq. 8}$$

Solutions satisfying the boundary conditions at $\theta=\alpha$, $\theta=-\beta$, are as follows:

$$U^s = A^s \cos(\lambda(\theta+\beta)); \ U^c = A^c \cos(\lambda(\theta+\alpha)) \quad \text{Eq. 9}$$

Continuity conditions in Equations 7 and 8 can be used to provide an equation for $\lambda$ such that:

$$\begin{vmatrix} \cos(\lambda\beta) & \cos(\lambda\alpha) \\ G^s \sin(\lambda\beta) & -G^c \sin(\lambda\alpha) \end{vmatrix} = 0 \Rightarrow \kappa \tan(\lambda\alpha) + \tan(\lambda\beta) = 0, \kappa \equiv \frac{G^c}{G^s} \quad \text{Eq. 10}$$

The original problem will not have a singularity point at point O if, between $0<\lambda\leq 1$ the only solution to Equation 10 is $\lambda=1$. Therefore, angle $\beta$ to eliminate singularities at point O should be:

$$\beta = \arctan(-\kappa \tan(\alpha)); \text{ or } \beta = \arctan(\kappa \tan(\phi)); \phi = \pi - \alpha \quad \text{Eq. 11}$$

To show that there are no other solutions of Equation 10 in the interval $0<\lambda<1$, make the left-hand side of Equation 10 a function of $\lambda$ such that:

$$f(\lambda) = \kappa \tan(\lambda\alpha) + \tan(\lambda\beta). \quad \text{Eq. 12}$$

Assuming that angle $\beta$ is given by Equation 11, we get $f(\lambda)=0$ for $\lambda=1$. Function $f(\lambda)$ monotonically decreases when $\lambda$ decreases, and hence it does not have any roots at least in the interval $\alpha/(\pi/2)<\lambda<1$. For $\lambda=\alpha/(\pi/2)$ function $f(\lambda)=-\infty$, and for $0<\lambda<\alpha/(\pi/2)$, function $f(\lambda)$ is positive. Thus, function $f(\lambda)$ does not have any roots within the interval $0<\lambda<1$. It is clear that if angle $\alpha$ is exactly equal to $\pi$, value $\lambda=1$ satisfies Equation 10 only when angle $\beta=\pi$, which is not of interest in our application.

Thus, a first conclusion is that without tapering the securing surfaces of composite material $\Omega_c$ and steel $\Omega_s$, singularity points cannot be eliminated.

Modulus ratio $\kappa$ (see Eq. 10) is relatively small as composite modulus $G_c$ is much smaller than steel modulus $G_s$. Angle $\beta$ is also small while $\alpha$ is close to, but smaller than $\pi$ to ensure that Equation 11 does not provide a negative $\beta$ value. Equation 11 can be represented asymptotically as:

$$\beta \approx \kappa\phi \quad \text{Eq. 13}$$

Thus, we arrive at a second conclusion which is that the ratio of the metal tapered angle $\beta$ to the composite tapered angle $\Phi$ is inversely related to the modulus ratio $\kappa$ (see FIG. 1).

A third conclusion regards stress concentration in metal member 12 corresponding to the case where $\lambda=1$. It follows from Equations 1 through 6 that stresses within member 12 do not depend on radial coordinate $\rho$. Therefore:

$$\sigma_{\rho z} = GU(\theta); \ \sigma_{\theta z} = GU'(\theta) \quad \text{Eq. 14}$$

Only radial components $\sigma_{\rho z}$ is discontinuous along joint OB, and this component is of extreme importance. Since both angles $\phi$ and $\beta$ are small, in the vicinity of joint OB component $\sigma_{\rho z}$ is very close to a Cartesian stress component $\sigma_{yz}$ which mainly carries the torque. It follows from Equation 14 that stress in the composite are smaller than in the metal and the ratio of composite to metal stresses can be expressed as:

$$\frac{\sigma_{\rho z}^c}{\sigma_{\rho z}^s} = \kappa \quad \text{Eq. 15}$$

Thus, the third conclusion is that the metal stress component $\sigma_{\rho z}^s$ is larger than the composite stress component $\sigma_{\rho z}^c$ by the ratio $1/\kappa$.

Referring still to FIG. 3, with respect to second end 26, angle $\alpha'$ is small while angle $\beta'$ is large. Here, $\beta'$ and $\alpha'$ can be substituted into Equation 10 where $\lambda=1$ to express $\beta'$ in terms of $\alpha'$ as:

$$\beta' = \pi - \arctan(\kappa\alpha') \quad \text{Eq. 16}$$

The asymptotic formula for small values of angle $\alpha$ is:

$$\beta' \approx \pi - \kappa\alpha' \quad \text{Eq. 17}$$

The reasoning above can be used to prove that Equation 16 is the only solution to Equation 10 in the interval $0<\lambda<1$. In particular, where angle $\alpha'$ is equal to $\phi=\pi-\alpha$, then:

$$\beta' = \pi - \beta \quad \text{Eq. 18}$$

This particular case is of special interest because there is an elementary analytical solution of an asymmetrical two dimensional elasticity problem for the entire joint OB which theoretically has no singularity point. The solution can be obtained for anisotropic material properties for both members 10 and 12, with the restriction that both materials should be orthotropic and coordinate z-axis should be one of the axis of orthotropy.

Referring still to FIG. 3, for simplicity, it is assumed that in the composite material the x and y-axis are the axis of orthotropy and that in metal material $\Omega_s$, the x' and y'-axis are the axis of orthotropy. Joint OB will be referred to herein as a singularity-free shear joint. It will be assumed that angles $\beta$ and $\phi$ satisfy Equation 11. In this case, as developed above:

$$\tan(\beta) = \kappa \tan(\phi); \text{ where } \kappa = G_{yz}^c / G_{yz}^s; \quad \text{Eq. 19}$$

In addition:

$$\left|\frac{AP}{CR}\right| = \frac{\sin\beta}{\sin\phi} \quad \text{Eq. 20}$$

and:

$$\sigma^a = \sigma^c \sin\phi \quad \text{Eq. 21}$$

where $\sigma^a$ is an adhesion stress and $\sigma^c = \sigma_{yz}^c$.

Equations describing the asymmetric plane elasticity in member 10 are as follows:

$$u_z = u_z(x,y) \quad \text{Eq. 22}$$

$$\gamma_{yz} = \frac{\partial u_z}{\partial y}; \ \gamma_{xz} = \frac{\partial u_z}{\partial x} \quad \text{Eq. 23}$$

-continued $$\begin{pmatrix} \sigma_{xz} \\ \sigma_{yz} \end{pmatrix} = \begin{pmatrix} G^c_{xz} & 0 \\ 0 & G^c_{yz} \end{pmatrix} \begin{pmatrix} \gamma_{xz} \\ \gamma_{yz} \end{pmatrix} \qquad \text{Eq. 24}$$

$$\frac{\partial \sigma_{xz}}{\partial x} + \frac{\partial \sigma_{yz}}{\partial y} = 0 \qquad \text{Eq. 25}$$

$\sigma_{xz} = 0$ on $OC$, $BR$  Eq. 26

$\sigma_{yz} = \sigma^c$ on $CR$  Eq. 27 where $\sigma^c$ is a constant. Equations describing the asymmetric plane elasticity in member 12 are as follows:

$$u_z = u_z(x', y') \qquad \text{Eq. 28}$$

$$\gamma_{y'z} = \frac{\partial u_z}{\partial y'}; \gamma_{x'z} = \frac{\partial u_z}{\partial x'} \qquad \text{Eq. 29}$$

$$\begin{pmatrix} \sigma_{x'z} \\ \sigma_{y'z} \end{pmatrix} = \begin{pmatrix} G^s_{x'z} & 0 \\ 0 & G^s_{y'z} \end{pmatrix} \begin{pmatrix} \gamma_{x'z} \\ \gamma_{y'z} \end{pmatrix} \qquad \text{Eq. 30}$$

$$\frac{\partial \sigma_{x'z}}{\partial x'} + \frac{\partial \sigma_{y'z}}{\partial y'} = 0 \qquad \text{Eq. 31}$$

$\sigma_{x'z} = 0$ on $OA$, $PB$  Eq. 32

$\sigma_{y'z} = \sigma^s$ on $PA$  Eq. 33 where $\sigma^s$ is a constant. It follows from equilibrium conditions that:

$$\sigma^s = \zeta \sigma^c \qquad \text{Eq. 34}$$

where:

$$\zeta \equiv \frac{\sin\phi}{\sin\beta} \approx \kappa^{-1} \qquad \text{Eq. 35}$$

Parameter $\zeta$ is referred to hereinafter as a stress concentration factor. For small tapering angles factor $\zeta$ is essentially equal to the ratio of metal shear modulus $G_s$ to composite shear modulus $G_c$. Note that Equation 34 is similar to Equation 15.

To check the solutions of Equations 34 and 35, with $\sigma_{x'z} = 0$, $\sigma_{y'z} = \sigma^s$, $\sigma_{xz} = 0$ and $\sigma_{yz} = \sigma^c$:

$$u_z(x', y') = y' \cdot \frac{\sigma^s}{G^s_{y'z}} \text{ in } \Omega^s \qquad \text{Eq. 36}$$

and $$u_z(x, y) = y \cdot \frac{\sigma^s}{G^c_{yz}} \text{ in } \Omega^c; \qquad \text{Eq. 37}$$

Equations 36 and 37 satisfy Equations 22 through 33. To check continuity along joint OB, $\sigma^a$ (the adhesion stress) is assumed to be the shear stress on joint OB. Stress continuity along joint OB exists if:

$$\sigma^a = \sigma^s \sin\beta = \sigma^c \sin\phi \qquad \text{Eq. 38}$$

Assuming $l$ is the direction B0 (see FIG. 3) then:

$$\vec{\ell} = \begin{pmatrix} \sin\beta \\ \cos\beta \end{pmatrix} \text{ in the } x'y' \text{ system and} \qquad \text{Eq. 39}$$

$$\vec{\ell} = \begin{pmatrix} \sin\phi \\ \cos\phi \end{pmatrix} \text{ in the } xy \text{ system.} \qquad \text{Eq. 40}$$

Displacement continuity conditions can be expressed as:

$$\frac{\partial u^c_z}{\partial l} = \frac{\partial u^s_z}{\partial l} \Leftrightarrow \frac{\sigma^s}{G^s_{x'z}} \cos\beta = \frac{\sigma^c}{G^c_{xz}} \cos\phi \qquad \text{Eq. 41}$$

Equation 41 is satisfied because of the relationships expressed in Equations 11, 34 and 35.

Thus, to design a singularity free shear joint, the following steps should be taken:

(1) First, with a known adhesion stress (i.e. $\sigma^a$) and known composite stress value $\sigma^c$, the composite taper angle $\sigma$ is determined from Equation 38. Equation 38 is repeated here as Equation 42:

$$\sin\phi = \frac{\sigma^a}{\sigma^c} \qquad \text{Eq. 42}$$

(2) Second, knowing the composite and metal shear moduli $G_{yz}{}^c$ and $G_{y'z}{}^s$, respectively, Equation 19 is used to find metal tapering angle $\beta$. Equation 19 is repeated here as Equation 43.

$$\tan\beta = \kappa \tan\phi, \kappa \equiv \frac{G^c_{yz}}{G^s_{y'z}} \qquad \text{Eq. 43}$$

(3) Third, Equations 34 and 35 (repeated as Eqs. 44 and 45) are used to determine shear stresses in metal member 12:

$$\sigma^s = \zeta \sigma^c \qquad \text{Eq. 44}$$

$$\zeta \equiv \frac{\sin\phi}{\sin\beta} \qquad \text{Eq. 45}$$

The solution derived above can be extended to a joint with an adhesive layer between members 10 and 12, and to the case of general orthotropy of material properties for all regions. Stress and strains in each member 10 are constant, while displacement $u_z$ is a linear function of coordinates. Consider vector $\vec{\sigma}$, whose components are stresses $\sigma_{xz}$, $\sigma_{yz}$. Also consider vector $\vec{\nabla}$, which is equal to the gradient of displacement $u_z$. If material is isotropic, vectors $\vec{\sigma}$ and $\vec{\nabla}$ are parallel. Vectors $\vec{\sigma}$ and $\vec{\nabla}$ are also parallel, if material is orthotropic with vector $\vec{\sigma}$ parallel to one of the axis of orthotropy (e.g. like the above case, where vector $\vec{\sigma}$ in material $\Omega_c$ is parallel to the y-axis where the y-axis is the axis of orthotropy). Since vectors $\vec{\sigma}$ and $\vec{\nabla}$ are related to each other through elasticity law, vector $\vec{\sigma}$ may be chosen arbitrarily, and vector $\vec{\nabla}$ will be determined from elasticity law. Assuming each member 10, 12 has two edges parallel to vector $\vec{\sigma}$, there are no stresses at the parallel edges.

Vectors $\vec{\sigma}^1$ and $\vec{\nabla}^1$ are chosen in member 10 where member 10 has edges parallel to vector $\vec{\sigma}^1$. Now member 10 is cut along the line comprising some angle $\phi$ to the parallel edges. Angle $\phi$ is arbitrary and referred to as the composite tapered angle. The resulting third edge of member 10 will be sheared by a third edge of member 12. From continuity conditions, component $\sigma_n$ of vector $\vec{\sigma}^1$, which is normal to the third edge, is continuous. In addition, a component $\nabla_\tau$, tangent to vector $\vec{\nabla}^1$ is continuous. Then, from elasticity law, in member 12, vectors $\vec{\sigma}^2$ and $\vec{\nabla}^2$ may be found. The direction of vector $\vec{\sigma}^2$ defines the direction of the stress free edges of wall 12. This process may be continued to add more regions to this chain. Once material properties of the next region are decided upon, the only parameter which is an arbitrary one is the tapered angle.

Referring again to FIGS. 2 and 3, adhesive layer 15 of constant thickness is placed between members 10 and 12. Since adhesive 15 contact lines with adherends 10 and 12 are parallel, components $\sigma_n$ and $\nabla_\tau$ on both securing surfaces 18 and 20 are the same. Thus, metal tapering angle $\beta$ is the same as before. Thus, a fourth conclusion related specifically to the case where an adhesive is provided between two securing surfaces 18 and 20 is that design steps 1 through 3 are not influenced by the adhesive thickness or its elastic properties.

FE analysis showed that for a steel-45° glass-epoxy composite tube joint, even with tube radius of as small as 1 inch for a thickness of 0.25 inches, stresses along a securing joint 14 differed less than 10% from ideal uniform distribution when the inventive joint was employed.

Thus, it should be appreciated that the relatively complex mathematics above yield a relatively simple set of three equations which can be used to determine characteristics of a joint between two tubular members having disparate shear modulus wherein the resulting joint is essentially singularity-free. In addition to providing an extremely strong bond between two tubular members, the inventive joint is also advantageous in that it is relatively short and is simple and inexpensive to construct.

In the superconducting motor environment, the inventive bond is particularly advantageous in that joint length, strength and cost are all important design criteria. In addition, the inventive joint allows a thermally insulating material (i.e., the composite) to be adhesively bonded to metal without singularity points along the joint. The inventive joint can be used to form composite-metallic torque tubes which can withstand massive torque levels associated with large motor shafts.

B. Torque Tube Configuration

Figure 4:
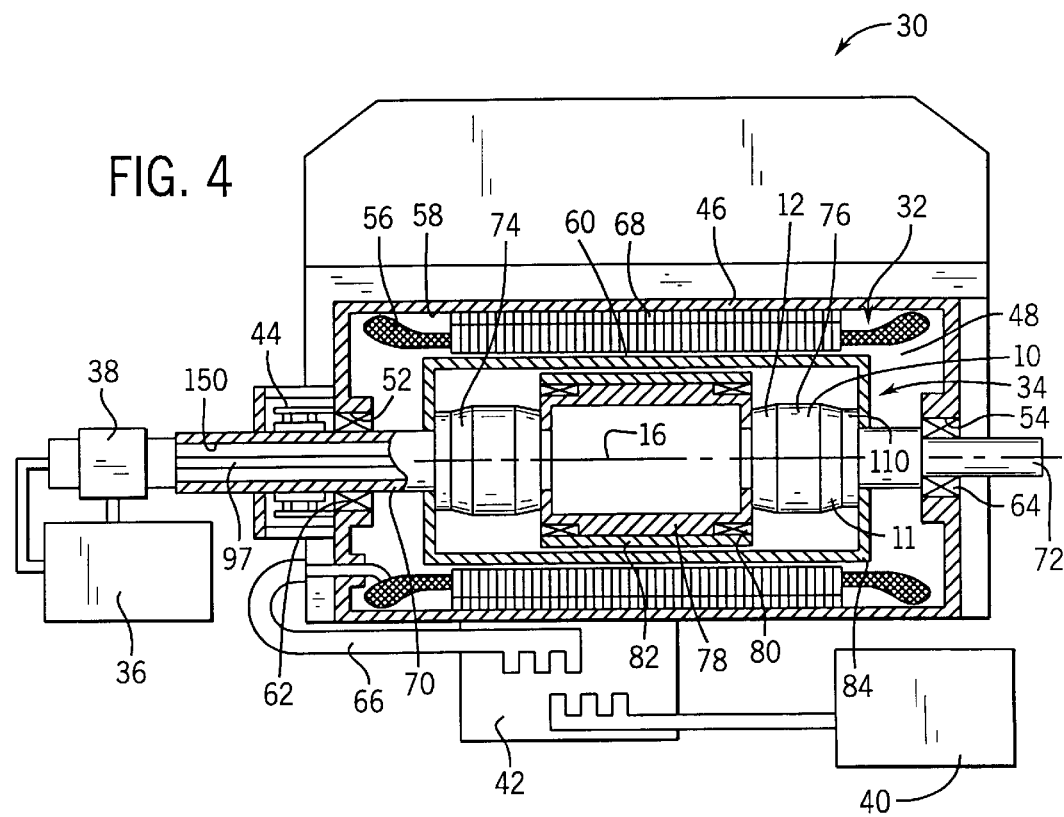
FIG. 4 is a partial cross-sectional view of a superconducting motor, including torque tubes according to the present invention.

Referring now to FIG. 4, the present invention will be described in the context of a superconducting motor system 30. System 30 includes a stator assembly 32, a rotor assembly 34, a cryogenic refrigeration system 36, an agent transfer coupling 38, an inverter 40, a connection box 42, a synchronous DC exciter 44 and various other components which will be described in more detail below.

Stator assembly 32 includes a cylindrical motor frame 46 which forms a motor chamber 48 about a rotation axis 16, frame 46 forming first and second shaft openings 52, 54 at opposite ends which are centered along axis 16. A plurality of stator windings collectively referred to by numeral 56 are mounted on an internal surface 58 of frame 46, windings 56 forming a stator cavity 60 therebetween. Two ball bearings 62, 64 are provided, one at each opening 52, 54, respectively. Supply lines 66 (only one is shown) connect windings 56 through box 42 to inverter 44 for supplying voltages to windings 56 as well known in the art. A laminated flux shield 68 is provided between frame 46 and windings 56.

Figure 5:
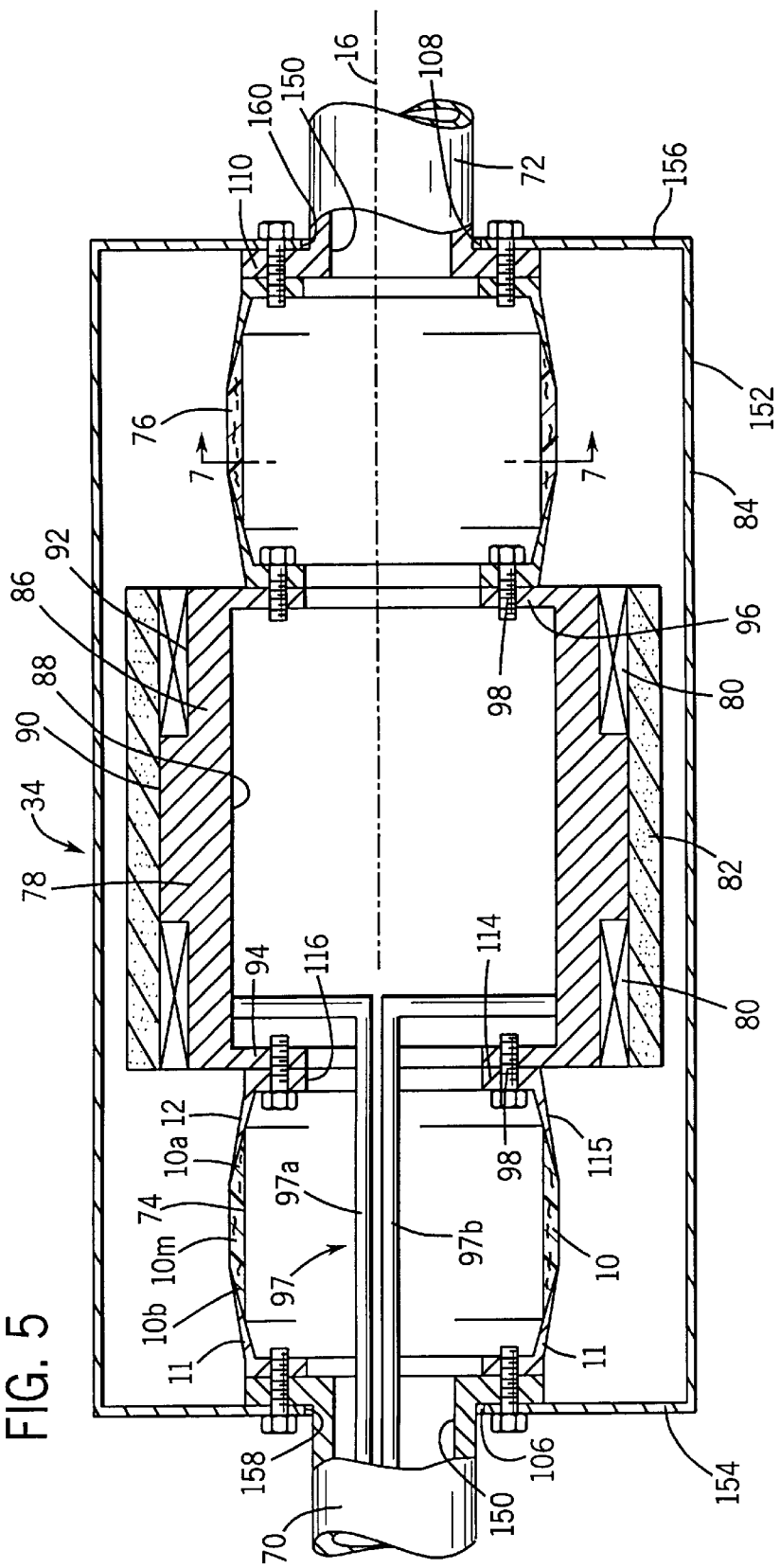
FIG. 5 is an enlarged cross-sectional view of the rotor assembly of FIG. 4.
Figure 6:
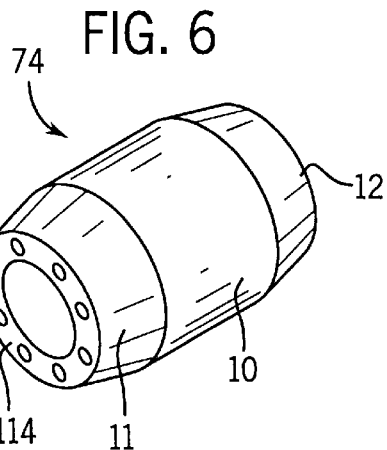
FIG. 6 is a perspective view of a torque tube according to the present invention.
Figure 7:
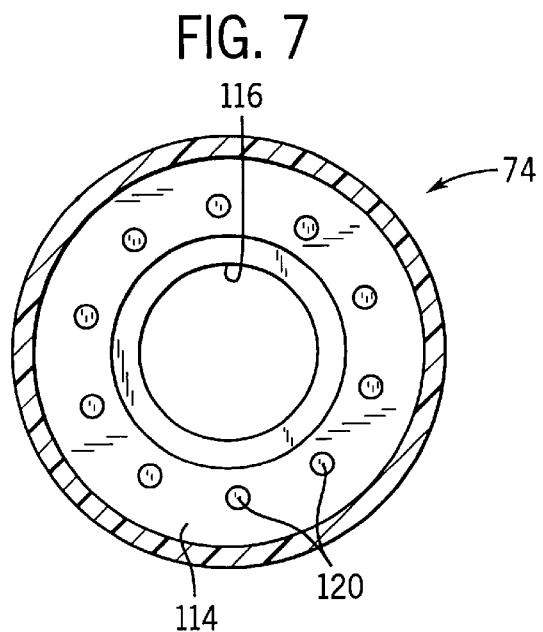
FIG. 7 is a cross-sectional view taken along the line 7—7 of FIG. 5.

Referring also to FIG. 5, rotor assembly 34 includes first and second shaft ends 70, 72, respectively, first and second torque tubes 74, 76 respectively, a coil support 78, rotor coils collectively referred to by numeral 80, an AC flux shield 82 and an outer vacuum jacket 84.

Support 78 includes a generally cylindrical member 86 having an internal surface 88 and an external surface 90. External surface 90 forms a plurality of recesses collectively referred to by numeral 92 for receiving windings 80. First and second annular flanges 94, 96, respectively, extend radially inwardly from surface 88 at opposite ends of member 86. Each flange 94, 96 forms a plurality of bolt receiving apertures collectively referred to by numeral 98 which are parallel to axis 50 and are equispaced about an associated flange 94 or 96.

Windings 80 are wound about member 86 within recesses 92 as well known in the art. Shield 82 is provided outside windings 80 and is spaced apart therefrom.

Tubes 74 and 76 are essentially identical and therefore, only tube 74 will be explained in detail here. Referring to FIGS. 5 through 8, tube 74 consists of three separate components including a thermally insulating composite cylinder 10 and first and second stainless steel couplers 11 and 12 adhesively secured to opposite proximal and distal ends 10a and 10b of cylinder 10. Adhesive is identified be reference numeral 15 in FIG. 2. Couplers 11 and 12 are identical, construction of ends 10a and 10b is identical and characteristics of the bonds between couplers 11, 12 and cylinder 10 are identical and therefore only coupler 12, end 10a and the bond therebetween will be explained her in detail.

Cylinder 10 has a midsection 10m between ends 10a and 10b. Along midsection 10m, cylinder 10 is completely cylindrical, defined by uniform internal and external diameters. However, at each end 10a and 10b, cylinder 10 forms a frusto-conical tapered external surface 18 which slopes radially inwardly from the midsection 10m to an adjacent end of the cylinder 110 (see FIG. 3).

Coupler 12 includes a circular end plate 114 and an integrally connected flange 115. Plate 114 forms a large central aperture 116 and a plurality of circumferentially equispaced bolt apertures around aperture 116, the bolt apertures collectively referred to by numeral 120. Apertures 120 are arranged such that they are alignable with apertures 98.

Flange 115 extends from the circumferential edge of plate 114. Referring specifically to FIG. 2, flange 115 is defined by inner and outer surfaces 20, and 22, respectively, inner proximal surface 22a has a frusto-conical shape which slopes radially outwardly and axially away from plate 114. Inner surface 20, also has a frusto-conical shape which slope radially outwardly and axially away from plate 114. However, surface 20 slopes outwardly to a greater degree than surface 22a. Outer surface 22, also referred to as an inclined surface, also has a frusto-conical shape which slopes radially outwardly and axially away from plate 114 and is parallel to surface 22a such that surfaces 20 and 22 intersect at a distal end 128 of flange 115. In addition, surface 20 slopes outwardly to the same degree that surface 18 slopes inwardly such that surface 20 is parallel to surface 18 at all points. Referring to FIG. 3, surface 22a is BP, surface 22 is OA, and surfaces 18 and 20 are OB as marked.

When secured together, surface 20 is adhered to surface 18 (see FIG. 2). The spacial relationship between plate 114 and internal surface 20 is such that, when surface 20 is parallel to surface 18, plate 114 is perpendicular to midsection 10m.

Referring to the mathematics described above and to FIGS. 2 and 3, tapered angles φ and β are illustrated. The three step process described above is used to determine both the composite tapered angle φ and the metal tapered angle β. Once angles φ and β have been determined, cylinder 10 and flanges 115 can be formed.

Referring to FIGS. 2 through 7, after surfaces 18, 20, 22a and 22 which define angles φ and β have been formed, tube 74 can be assembled. To assembly tube 74, an adhesive 15 is evenly applied to surface 18. Preferred adhesives are HYSO EA-9330, HYSOL EA 9628 and AF-563. Then, coupler 12 is positioned adjacent cylinder 10 such that end 10a is received inside flange 115 with surface 20 parallel to surface 18 and in contact with adherend 15. Adherend 15 is allowed to cure forming a strong bond between coupler 12 and cylinder 10. Coupler 11 is secured to cylinder 10 in a similar fashion.

Referring again to FIGS. 2, 4 and 5, first shaft end 70 is cylindrical and hollow and forms a radially outwardly projecting extension 110. Extension 110 forms a plurality bolt apertures 112 which are parallel to axis 16, equispaced around extension 110 and should be arranged so as to align with apertures 120.

Second shaft end 72 is similar shaft end 70 except that it is not hollow. Although not illustrated, end 72 is configured so as to be securely attachable to a load (i.e. end 72 is a drive shaft).

Vacuum jacket 84 includes a generally cylindrical lateral wall 152 and first and second end walls 154, 156 on opposite ends of wall 152. Walls 154 and 156 each form a central aperture 158, 160, apertures 158 and 160 alignable along rotation axis 16. Jacket 84 should be formed of stainless steel. A seal 106, 108 is provided along the edge of each aperture 158, 160, respectively.

To assemble assembly 34, tube 74 is positioned so that extension 114 is adjacent extension 110 with apertures 120 aligned with apertures 98. Nuts and bolts are used to secure tube 74 to supporter 78. Similarly, tube 76 is attached to flange 96. When so attached, tubes 74 and 76 should only contact support 78 via flanges 94 and 96.

With windings 80 arranged inside recesses 92 and shield 82 secured adjacent windings 80, shaft end 70 and wall 154 are attached to end plate 11 via bolts and nuts. Similarly, shaft end 72 and wall 156 are attached to the distal end of tube 76 (see FIG. 5). A cryogenic delivery tube 97, including supply and return sections 97a and 97b, respectively, extends through end 70 and tube 74 into supporter 78 as well known in the art. Tube 97 provides cryogenic coolant to supporter 78.

When assembly 34 is configured in the manner described above and as illustrated in FIGS. 2 through 7, tubes 74 and 76 and supporter 78 are coaxial around axis 16.

Referring again to FIG. 4, refrigeration system 36, transfer coupling 38, exciter 44, connection box 42, delivery tube 97 and inverter 40 are all well known in the art and therefore will not be explained here in detail.

Referring still to FIG. 4, assembly 34 is mounted inside cavity 60 so that a gap exists between the external surface of jacket 84 and stator windings 56. Shaft ends 70, 72 extend axially outwardly along axis 16 and are supported by bearings 62, 64 within openings 158, 160. First end 70 is connected to transfer coupling 38. Tube 97 extends through coupling 36 to system 16 for receiving cooling agent for delivery to support 78. The agent cools windings 80 through supporter 78.

Figure 8:
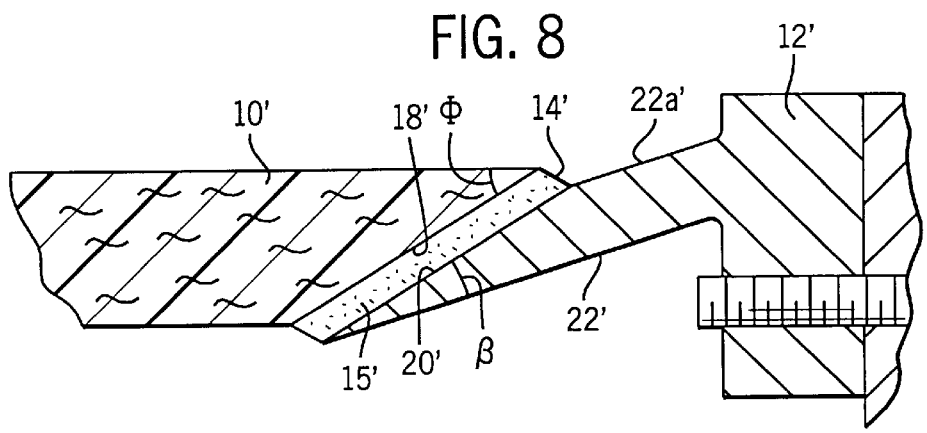
FIG. 8 is similar to FIG. 2, albeit being a second embodiment of a joint according to the present invention.

It should be understood that the methods and apparatuses described above are only exemplary and do not limit the scope of the invention, and that various modifications could be made by those skilled in the art that would fall under the scope of the invention. For example, while the invention is described as including a torque tube formed from a composite conduit and two steel end ring couplers, clearly, the couplers could be formed as integral pieces of the shaft and the internal surface of the support, the shaft and internal surface forming the securing inner and outer surfaces at the angles described above. In addition, while the invention is described as one wherein a composite external surface forms the composite securing surface, an inner surface of the coupler forms the metal securing surface and an outer surface of the coupler forms the incline surface, the invention could also be practiced where a composite internal surface forms the composite securing surface, an outer surface of the coupler forms the metal securing surface and an inner surface of the coupler forms the incline surface. FIG. 8 illustrates a single two-dimensional section of a joint configured in accordance with this second embodiment. In FIG. 8, components, angles and surfaces which are similar to components, angles and surfaces in FIGS. 2 through 7 are identified by the same numbers, albeit further distinguished by a "'". Thus, 10' is a composite member, 12' a metal member, 14' a joint, 15' an adhesive layer and so on. In FIG. 8, internal surface 18' of member 10' is the composite securing surface, distal outer surface 20' is the metal securing surface, surface 22' is the incline or inner surface and 22a' is a metal proximal surface or proximate outer surface. Angles β and φ are as illustrated. The three step procedure described above is used to find angles φ and β thus producing an essentially singularity-free joint 14'.

Furthermore, while it is preferred that the first and second angles be determined according to the equations above, clearly, other similar angles could be used although the likelihood of a singularity point may be increased. In this respect, in a broad sense, the invention is meant to cover any composite/metal torque tube wherein joints between composite and metal are secured via an adhesive. Moreover, the invention is also meant to generally cover bonding of two cylindrical members end to end wherein the materials have disparate shear modulus. To this end, the Equations above should be used to identify precise first and second angles.

To apprise the public of the scope of this invention, we make the following claims.

I claim:

1. A torque tube for use in connecting a rotor shaft to a superconducting motor rotor winding support, the tube comprising:

a rigid tubular member formed symmetrically around an axis of a first material, the member having proximal and distal ends and internal and external surfaces; and first and second couplers connectable to the shaft and support, respectively, the couplers formed of a second material which is different than the first material, each coupler including a circular end plate and a circumferential wall extending essentially axially from an edge of the end plate to a wall edge opposite the end plate, each wall having inner and outer surfaces, the inner surface including proximal and distal inner surfaces, each proximal inner surface separating the distal inner surface from an associated end plate, each proximal inner surface slopes radially outwardly and axially away from an adjacent end plate and each distal inner surface slopes radially outwardly and axially away from an adjacent proximal inner surface to an associated wall edge, wherein the distal inner surfaces form both proximal and distal second securing surfaces and the external surface forms both proximal and distal first securing surfaces which conform to the second securing surfaces and, wherein, the distal inner surface defines a first angle with respect to the axis, the outer surface defines a second angle with respect to the distal inner surface, each of the first and second materials is characterized by a shear modulus, the first and second angles are a function of the shear modulus and the distal first and second securing surfaces are secured together and the proximal first and second securing surfaces are secured together by an adhesive.

2. The tube of claim 1 wherein both of the first and second connector pairs are secured by an adhesive.

3. The tube of claim 2 wherein the first material is a thermal insulator and the second material is a metal.

4. The tube of claim 3 wherein the first material is a glass-epoxy composite.

5. The tube of claim 4 wherein the member is cylindrical.

6. The tube of claim 5 wherein the couplers are secured to the support and shaft via a plurality of bolts.

7. The tube of claim 5 wherein the member has internal and external surfaces and each coupler includes a circular end plate and a circumferential wall extending essentially axially from an edge of the end plate to a wall edge opposite the end plate, each wall having inner and outer surfaces, the internal and external surfaces each being first surfaces and the inner and outer surfaces each being second surfaces, one of the first surfaces forming a proximal first securing surface at the proximal end, one of the first surfaces forming a distal first securing surface at the distal end, one of the first coupler second surfaces forming a proximal second securing surface and one of the second coupler second securing surfaces forming a distal second securing surface, the distal first and second securing surfaces secured together and the proximal first and second securing surfaces secured together.

8. The tube of claim 7 wherein the external surface forms both the proximal and distal first securing surfaces and the inner surfaces form both the proximal and distal second securing surfaces.

9. The tube of claim 1 wherein an adhesive which adhesively bonds is characterized by an adhesion stress and the composite is characterized by a composite stress and the first and second angles are a function of the adhesion and composite stresses.

10. The tube of claim 9 wherein the first angle is determined according to the equation:

$$\sin\varphi = \frac{\sigma^a}{\sigma^c}$$

where $\sigma^a$ is the adhesion stress and $\sigma^c$ is the composite stress.

11. The tube of claim 10 wherein the second angle is determined according to the equation:

$$\tan\beta = \frac{G^c_{yz}}{G^s_{y'z}} \cdot \tan\varphi$$

where $G_{yz}{}^c$ is the composite shear modulus in a y-z direction where y is parallel to the external surface and z is perpendicular thereto at any given point and $G_{y'z}{}^s$ is the metal shear modulus in a y'-z direction where y' is parallel to the outer surface at any given point.

12. A torque tube for use in connecting a rotor shaft to a superconducting motor rotor winding support, the tube comprising:

a rigid tubular cylindrical member formed of a thermally insulating glass-epoxy composite, the member having proximal and distal ends and internal and external surfaces, the external surface forming proximal and distal first securing surfaces; and first and second metallic couplers connectable to the shaft and support, respectively, the first coupler and proximal end comprising a first connector pair and the second coupler and distal end forming a second connector pair, each coupler includes a circular end plate and a circumferential wall extending essentially axially from an edge of the end plate to a wall edge opposite the end plate, each wall having inner and outer surfaces, each inner surface including proximal and distal inner surfaces, each proximal inner surface separating the distal inner surface from an associated end plate, each proximal inner surface slopes radially outwardly and axially away from an adjacent end plate and each distal inner surface slopes radially outwardly and axially away from an adjacent inner surface to an associated wall edge, the distal inner surfaces forming a proximal second securing surface and a distal second securing surface, the outer surfaces parallel to the proximal inner surfaces, the first securing surfaces conforming to adjacent distal inner surfaces, the distal first and second securing surfaces secured together and the proximal first and second securing surfaces secured together by an adhesive.

13. The tube of claim 12 wherein the member is symmetrically formed around an axis, the distal inner surface defines a first angle with respect to the axis, the outer surface defines a second angle with respect to the distal inner surface, each of the first and second materials is characterized by a shear modulus and the first and second angles are a function of the shear modulus.

14. The tube of claim 13 wherein an adhesive which adhesively bonds is characterized by an adhesion stress and the composite is characterized by a composite stress and the first and second angles are a function of the adhesion and composite stresses.

15. The tube of claim 14 wherein the first angle is determined according to the equation:

$$\sin\phi = \frac{\sigma^a}{\sigma^c}$$

where $\sigma^a$ is the adhesion stress and $\sigma^c$ is the composite stress.

16. The tube of claim 15 wherein the second angle is determined according to the equation:

$$\tan\beta = \frac{G^c_{yz}}{G^s_{y'z}} \cdot \tan\phi$$

where $G_{yz}{}^c$ is the composite shear modulus in a y-z direction where y is parallel to the external surface and z is perpendicular thereto at any given point and $G_{y'z}{}^s$ is the metal shear modulus in a y'-z direction where y' is parallel to the outer surface at any given point.

17. A torque tube for use in coupling a rotor shaft to a superconducting motor rotor winding support, the support and shaft each having proximal and distal inner surfaces, the distal inner surfaces forming securing surfaces for connection to the tube, the support and shaft each formed of a metal, each of the shaft and support also including an outer surface opposite the securing surfaces, the proximal inner surfaces adjacent the support and shaft and separating the support and shaft from the distal inner surfaces, each of the support and shaft securing surfaces slopes radially outwardly to an associated wall edge, each outer surface sloping radially outwardly to an associated wall edge and each proximal inner surface parallel to an associated outer surface, the tube comprising:

a rigid tubular member formed of glass epoxy and having proximal and distal member securing surfaces at proximal and distal ends, respectively, the tube also having an external surface, the external surface forming proximal and distal member securing surfaces such that the proximal and distal member securing surfaces conform to adjacent shaft and support securing surfaces.

18. The tube of claim 17 wherein the member is symmetrically formed around an axis, the distal inner surfaces define a first angle with respect to the axis, the outer surfaces define a second angle with respect to the distal inner surfaces, each of the first and second materials is characterized by a shear modulus and the first and second angles are a function of the shear modulus.

19. A joint assembly for co-axially connecting cylindrical members along a joint, the assembly essentially eliminating stress singularities along the joint, the assembly comprising:

a first tubular member formed of a first material having a first shear modulus, the first member formed around an axis and having a proximal edge at a proximal end and having internal and external surfaces, the internal and external surfaces each being first surfaces, one of the first surfaces forming a first proximal surface at the proximal end, at least a portion of the first proximal surface sloped radially to the proximal edge so as to define a first angle with respect to the axis; and a second tubular member formed of a second material having a second shear modulus, the second member having a proximate edge at a proximate end and having inner and outer surfaces, the inner and outer surfaces each being second surfaces, one of the second surfaces forming a proximate surface at the proximate end and the other of the second surfaces forming an incline surface, the proximate surface including proximal and distal second surfaces, the proximal second surface separating the member from the distal second surface, the distal second surface sloped radially to the proximate edge such that the distal second surface conforms to the proximal first surface, at least a portion of the incline surface sloped radially to the proximate edge so as to define a second angle with respect to the axis, the proximal second surface parallel to the incline surface, the proximal first and distal second surfaces secured together by an adhesive layer;

wherein, the first and second angles are a function of the first and second shear modulus.

20. The assembly of claim 19 wherein the first material is a glass-epoxy composite and the second material is a metal.

21. The assembly of claim 20 wherein the external surface forms the proximate surface, the inner surface forms the proximal first surface and the outer surface forms the incline surface.

22. The assembly of claim 21 wherein the adhesive is characterized by an adhesion stress and the composite is characterized by a composite stress and the first and second angles are a function of the adhesion and composite stresses.

23. The assembly of claim 22 wherein the first angle is determined according to the equation:

$$\sin\phi = \frac{\sigma^a}{\sigma^c}$$

where $\sigma^a$ is the adhesion stress and $\sigma^c$ is the composite stress.

24. The tube of claim 23 wherein the second angle is determined according to the equation:

$$\tan\beta = \frac{G^c_{yz}}{G^s_{y'z}} \cdot \tan\phi$$

where $G_{yz}^c$ is the composite shear modulus in a y-z direction where y is parallel to the external surface and z is perpendicular thereto at any given point and $G_{y'z}^s$ is the metal shear modulus in a y'-z direction where y' is parallel to the outer surface at any given point.

25. A torque tube for use in connecting a rotor shaft to a superconducting motor rotor winding support, the tube comprising:

a rigid tubular member formed symmetrically around an axis of a first material, the member having proximal and distal ends and internal and external surfaces; and first and second couplers connectable to the shaft and support, respectively, the couplers formed of a second material which is different than the first material, each coupler including a circular end plate and a circumferential wall extending essentially axially from an edge of the end plate to a wall edge opposite the end plate, each wall having inner and outer surfaces, the outer surface including proximal and distal outer surfaces, each proximal outer surface separating the distal outer surface from an associated end plate, each proximal outer surface slopes radially inwardly and axially away from an adjacent end plate and each distal outer surface slopes radially inwardly and axially away from an adjacent proximal outer surface to an associated wall edge, wherein the distal outer surfaces form both proximal and distal second securing surfaces and the internal surface forms both proximal and distal first securing surfaces which conform to the second securing surfaces and, wherein, the distal outer surface defines a first angle with respect to the axis, the inner surface defines a second angle with respect to the distal outer surface, each of the first and second materials is characterized by a shear modulus, the first and second angles are a function of the shear modulus, the distal first and second securing surfaces are secured together and the proximal first and second securing surfaces secured together by an adhesive.

26. The tube of claim 25 wherein an adhesive which adhesively bonds is characterized by an adhesion stress and the composite is characterized by a composite stress and the first and second angles are a function of the adhesion and composite stresses.

27. The tube of claim 25 wherein the first angle is determined according to the equation:

$$\sin\varphi = \frac{\sigma^a}{\sigma^c}$$

where $\sigma^a$ is the adhesion stress and $\sigma^c$ is the composite stress.

28. The tube of claim 27 wherein the second angle is determined according to the equation:

$$\tan\beta = \frac{G^c_{yz}}{G^s_{y'z}} \cdot \tan\varphi$$

where $G^c_{yz}$ is the composite shear modulus in a y-z direction where y is parallel to the external surface and z is perpendicular thereto at any given point and $G^s_{y'z}$ is the metal shear modulus in a y'-z direction where y' is parallel to the outer surface at any given point.

29. A torque tube for use in coupling a rotor shaft to a superconducting motor rotor winding support, the support and shaft each having proximal and distal outer surfaces, the distal outer surfaces forming securing surfaces for connection to the tube, the support and shaft each formed of a metal, each of the shaft and support also including an inner surface opposite the securing surfaces, the proximal outer surfaces adjacent the support and shaft and separating the support and shaft from the distal outer surfaces, each of the support and shaft securing surfaces slopes radially inwardly to an associated wall edge, each inner surface sloping radially inwardly to an associated wall edge and each proximal outer surface parallel to an associated inner surface, the tube comprising:

a rigid tubular member formed of glass epoxy and having proximal and distal member securing surfaces at proximal and distal ends, respectively, the tube also having an internal surface, the internal surface forming proximal and distal member securing surfaces such that the proximal and distal member securing surfaces conform to adjacent shaft and support securing surfaces.

30. The tube of claim 29 wherein the member is symmetrically formed around an axis, the distal outer surfaces define a first angle with respect to the axis, the inner surfaces define a second angle with respect to the distal outer surfaces, each of the first and second materials is characterized by a shear modulus and the first and second angles are a function of the shear modulus.

* * * * *